(12) United States Patent
Sauermann

(10) Patent No.: US 8,171,422 B2
(45) Date of Patent: May 1, 2012

(54) SYSTEM AND METHOD FOR SCROLLING DATA

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 1774 days.

(21) Appl. No.: 11/098,958

(22) Filed: Apr. 4, 2005

(65) Prior Publication Data

US 2006/0010140 A1   Jan. 12, 2006

(51) Int. Cl.
*G06F 3/048* (2006.01)
(52) U.S. Cl. ........................................ 715/784; 715/802
(58) Field of Classification Search .................. 715/787, 715/784; 707/100
See application file for complete search history.

(56) References Cited

U.S. PATENT DOCUMENTS

| | | | | |
|---|---|---|---|---|
| 6,421,071 | B1* | 7/2002 | Harrison ........................ | 715/787 |
| 6,738,084 | B1* | 5/2004 | Kelley et al. ................... | 715/784 |
| 6,816,174 | B2* | 11/2004 | Tiongson et al. ............. | 715/787 |
| 2002/0126155 | A1* | 9/2002 | Lin-Hendel .................... | 345/785 |
| 2004/0021695 | A1* | 2/2004 | Sauermann et al. ........... | 345/786 |
| 2004/0268270 | A1* | 12/2004 | Hill et al. ....................... | 715/963 |
| 2005/0021924 | A1* | 1/2005 | Bergen et al. ................. | 711/173 |
| 2005/0091606 | A1* | 4/2005 | Sauermann .................... | 715/788 |
| 2006/0174214 | A1* | 8/2006 | McKee et al. ................. | 715/802 |

\* cited by examiner

*Primary Examiner* — Boris Pesin
*Assistant Examiner* — Brandon Parker
(74) *Attorney, Agent, or Firm* — Kenyon & Kenyon LLP

(57) ABSTRACT

In a system and method for displaying data, a processor may simultaneously scroll at different paces through a first data and through a second data in response to a single scroll instruction.

22 Claims, 6 Drawing Sheets

FIG. 6

SYSTEM AND METHOD FOR SCROLLING DATA

BACKGROUND

A computer system may provide collections of data. For example, each data collection may pertain to a particular component in a distributed network. The data collections may interrelate. The interrelation may be, e.g., with respect to the commonality of particular objects, places, events, people, and/or categories of information or data to the collections of data. For example, each data element, e.g., a data record, of the collections of data may be associated with one or more events. Those data elements of each of the data collections that correspond to the same event may be said to interrelate. Another example may be where the data elements of the data collections are sorted according to the same sorting algorithm, e.g., alphabetically, numerically, by date and/or time, or other conventional sorting algorithms. Data elements of the data collections may accordingly be said to interrelate if they correspond to the same letter, number, or date and/or time, respectively. Similarly, they may be said to at least approximately relate if they correspond to the same interval of letters, numbers, etc.

Data collections are conventionally stored, e.g., in a computer memory. For example, they may be stored in a file or database. A user may view the data collections, for example, via a user interface in which the data collections, or portions of the data collections are displayed. The user may select a particular data collection to be displayed in the user interface. Often the data collections include more data elements than that which can be displayed at once in the user interface. To view all of the data elements, the user may scroll through the data collection.

It may be desirable for the user to view those records of all or a number of the data collections that relate to a particular object, place, event, person, letter, number, time, etc. There are a number of conventional ways for the user to do so. It is conventional for the user to perform separate searches for each data collection. For example, the user may enter search parameters. The search parameters may include an identification of a particular data collection, and a particular time interval for example. The user may repeat the search a number of times, each time changing the identification of the data collection. However, since only matching records are returned and displayed, the user does not readily ascertain the context of the particular returned records. For example, data that corresponds to a time interval immediately proceeding the searched time interval, although not directly relevant, may provide a context for the data records that correspond to the searched time interval. Furthermore, since the records of each of the searched data collections are separately returned in response to separate searches, the interrelationship of the data records of the different data collections may not be immediately apparent to the user. It is also conventional to provide a number of windows in the user interface. Each window includes the data records of a particular data collection. However, if the number of records of the data collections that match the search criteria are too numerous to display at once in the windows, then the user must scroll through the records to view all of the matching records. Since the user separately scrolls through each of the windows, the user cannot readily ascertain the interrelationship between the matching records of each of the data collections.

It is also conventional for the user to simultaneously search a number of data collections. In response to the search, the records of all searched data collections may be combined into a single list, for example sorted according to the searched time interval. However, it may be desirable for the user to keep track of the particular data collections to which each of the displayed records belongs. For example, the user may want to view data records or entries generated or entered at a particular time interval for all components on the distributed network, but may want to view the data in order to draw conclusions regarding the functionality of each component separately and of the interaction between the components. However, where all records are combined into a single list, it is difficult to keep track of the particular data collections to which each of the displayed records belongs.

Accordingly, there is a need in the art for a system and method for displaying data of a number of data collections to aid a user in determining a relationship of data of a particular data collection to other data of the same data collection and to other data of different data collections.

BRIEF DESCRIPTION OF THE DRAWINGS

FIG. 6 is a screenshot that illustrates an example window in which a plurality of trace files are concurrently displayed, according to an embodiment of the present invention.

DETAILED DESCRIPTION

Embodiments of the present invention generally relate to a computer system and method that simultaneously displays data of a number of data collections in separate panes, and that provides for the simultaneous scrolling of the data in each of the panes, so that data of the displayed panes that most closely relate are simultaneously displayed. The embodiments particularly, though not exclusively, relate to time-sorted trace files of components of a distributed network. In response to a single scrolling instruction, a processor may scroll the data of each of the displayed panes. The scrolling pace may vary between each of the panes, and the scrolling pace of a single pane may vary between responses to each of multiple scrolling instructions. The variations in the scrolling pace may be according to the interrelationship of the data to which the panes are assigned.

Figure 1:
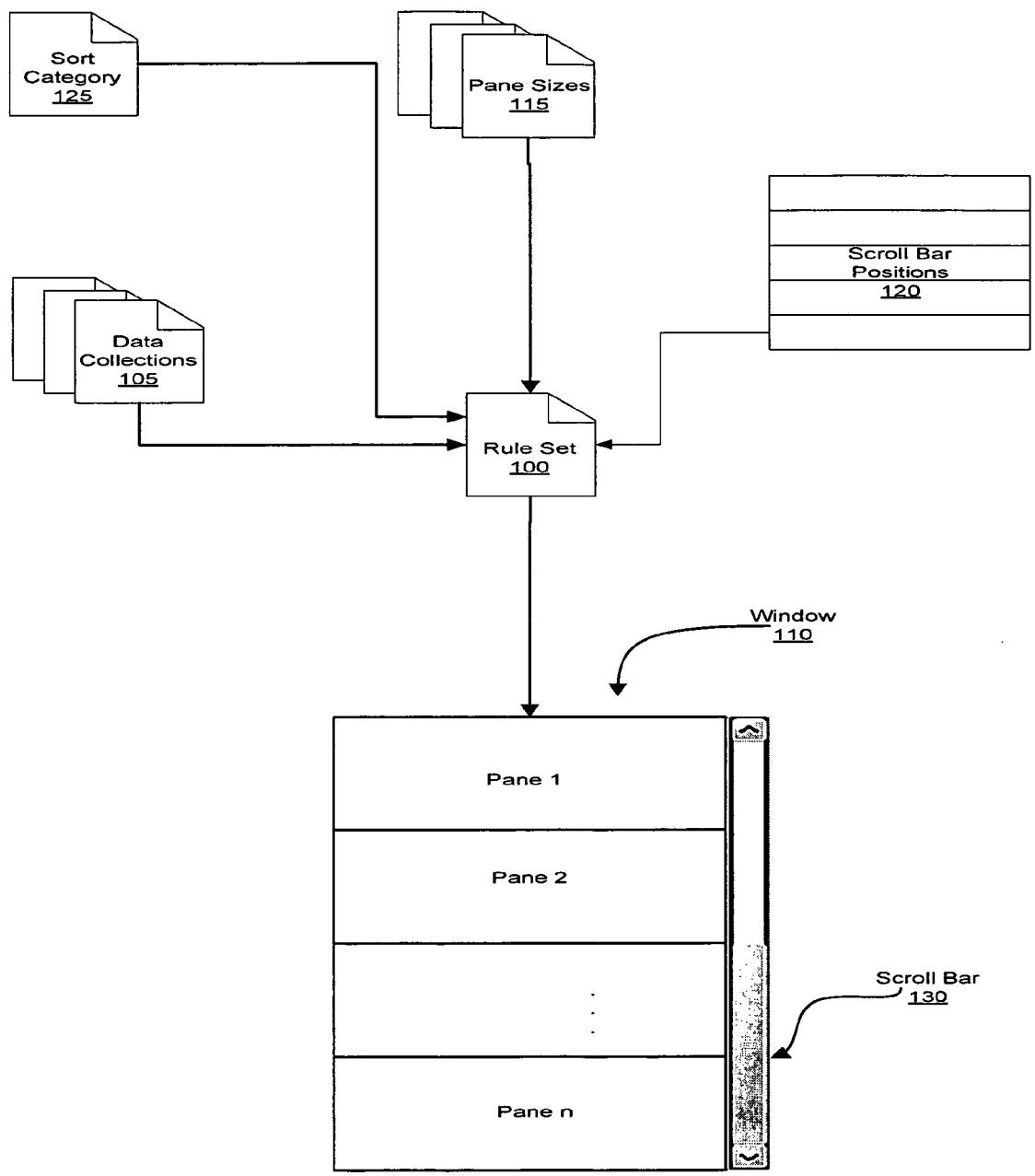
FIG. 1 is a block diagram that illustrates components of an example system according to an embodiment of the present invention.

FIG. 1 is a diagram that illustrates the arrangement of data within multiple panes according to a rule set 100, e.g., program code, according to an embodiment of the present invention. Each of a number of sorted data collections 105 may be assigned a corresponding pane in a window 110 of a user interface. The data collections 105 may be sorted, for example, according to time. The rule set 100 may define the number of records of a data collection 105 that may be displayed within a corresponding pane based on a pane size 115 of the corresponding pane. The records of each of the data collections 105 that are to be displayed in the panes of the window 110 may be determined according to the rule set 100 based on a scroll bar position 120, the pane sizes 115, and the content of the records with respect to a reference category according to which the data collections 105 are sorted, e.g., time. For each change in the scroll bar position 120, the extent of a change in each pane of the window 110 may vary.

The rule set 100 may associate each scroll bar position 120 with a particular point in a sequence of a sort category 125, e.g., a particular point in time, a particular letter of the alphabet, etc., depending on the criteria according to which the data collections 105 are sorted. A number of scroll bar positions 120 may be associated with the same point in the sort category 125, for example where a data collection 105 includes a number of records associated with the same point, e.g., a number of records are recorded at the same time, begin with the same letter, etc. Accordingly, as the scroll bar position 120 is changed, the point of the sort category 125 to which the scroll bar position 120 is associated eventually changes if there is a scroll bar position 120 associated with a subsequent point in the sort category 125. In an embodiment of the present invention, the sort category 125 may also include points with which no scroll bar position 120 is associated, for example, if the points are not associated with any record of any of the data collections 105.

Accordingly, some points in the sort category 125 may be associated with a plurality of scroll bar positions 120, others may be associated with only one scroll bar position 120, and still others may be associated with no scroll bar positions 120. As the scroll bar position 120 is changed from a first position to a last position of an interval of positions associated with a single point in the sort category 125, the number of records of a particular data collection 105 scrolled in a corresponding pane in response to the change in the scroll bar position 120 may depend on the number of records associated with the point in the sort category 125 to which the interval of scroll bar positions 120 corresponds. For example, if a first data collection 105 includes as many corresponding records as there are scroll bar positions 120 in the interval, then for each new scroll bar position 120 in the interval, the first data collection 105 may be scrolled by one record (if the records of the first data collection 105 that correspond to the scroll bar positions 120 in the interval are not already displayed before beginning to scroll). If a second data collection 105 includes only one corresponding record for the scroll bar position interval, then (even where the pane corresponding to the second data collection 105 is too small to display more than one record at a time) the second data collection 105 may be scrolled by only one record as the scroll bar position 120 traverses the entire interval.

In one embodiment of the present invention, each pane may be of equal size by default. For example, the window 110 may be divided into equal panes of equal size. In an alternative embodiment, the pane sizes 115 may vary. For example, a first pane size may be automatically set according to a comparison of the number of records included in the data collection to which the first pane is assigned to the number of records included in the data collection to which the other panes are assigned. Alternatively, a user may manually set each of the pane sizes 115. The pane sizes 115 may affect the rate at which corresponding data collections 105 scroll in response to a change in the scroll bar position 120. For example, if a pane assigned to a particular data collection 105 is large and concurrently displays numerous records, a particular record of the data collection 105 may be displayed even before the scroll bar is moved to a scroll bar position 120 that corresponds to the particular record. Accordingly, as the scroll bar is moved to the scroll bar position 120 that corresponds to the particular record, scrolling of the records of the data collection may be omitted. On the other hand, if the pane size 115 of the same pane is reduced to display, for example, only one record at a time, then the records of the data collection would be continuously scrolled as the scroll bar is moved towards the scroll bar position 120 that corresponds to the particular record.

Various rule sets 100 may be alternatively provided according to which the records in each of the panes of the window 110 may be scrolled in response to movement of a single scroll bar 130. According to each of the rule sets 100, records in each of a plurality of panes concurrently displayed in window 110 may be scrolled so that closely related records of the data collections 105 to which the plurality of panes are assigned are concurrently displayed at least when the scroll bar 130 is at a scroll bar position that at least approximately corresponds to the closely related records. For example, in one embodiment, a rule set 100 may provide for the display of a record that corresponds to a scroll bar position 120 at the top or bottom of the pane. The records may accordingly scroll in response to the movement of the scroll bar 130 to a new scroll bar position 120.

In an alternative embodiment, the rule set 100 may provide for the display of records that most closely relate to the scroll bar position 120. For example, it may be determined that a pane corresponding to a particular data collection 105 concurrently displays up to 'n' records. For a particular scroll bar position 120, the records of the data collection 105 that correspond to the particular scroll bar position 120 and to preceding and following scroll bar positions 120 may be determined. The proximity between the particular scroll bar position 120 and the preceding and following scroll bar positions 120 that correspond to records of the data collection 105 may be determined. If the data collection 105 includes a record that corresponds to the particular scroll bar position 120, then it may be displayed along with up to n−1 other records that correspond to preceding and/or following scroll bar positions that are closest to the particular scroll bar position 120. If the data collection 105 does not include a record that corresponds to the particular scroll bar position 120, then n other records that correspond to the closest scroll bar positions may be displayed. It may occur that for a number of consecutive scroll bar positions 120, the same n records of a particular data collection 105 are displayed if of all the records of the particular data collection 105, the scroll bar positions to which these same n records correspond are the closest to each of the number of consecutive scroll bar positions 120. It may therefore occur that in response to movement of the scroll bar 130 between the number of consecutive scroll bar positions 120, records of one of the panes are scrolled while records of another one of the panes are not scrolled. The paces at which records of a number of data collections 105 are scrolled may therefore vary. Furthermore, the pace at which records of a single data collection 105 are scrolled may also therefore vary between different intervals of scroll bar positions 120.

In an embodiment of the present invention, each scroll bar position 120 may correspond to at least one record in the plurality of data collections 105 to which the panes of window 110 are assigned. For example, if the data collections 105 are sorted according to time stamps, and include a record with a time stamp of 1:25:05, a record with a time stamp of 2:36:08, and no record with a time stamp between 1:25:05 and 2:36:08, then a first scroll bar position 120 may correspond to the time stamp of 1:25:05, and the immediately following scroll bar position 120 may correspond to the time stamp 2:36:08. If a number of records include the same time stamp, then a number of scroll bar position 120 may correspond to the same time stamp, i.e., the same point within the sort category 125, but to different records.

In one embodiment of the present invention, the size of the scroll bar 130 may be set according to a ratio of the number of scroll bar positions 120 to the size of the window 110. In an alternative embodiment, the size of the scroll bar 130 may be set according to a ratio of the number of scroll bar positions 120 to the pane size 115 of the smallest pane of the window 110. One skilled in the art can appreciate that the size of the scroll bar can be set according to a variety of algorithms.

Figure 2:
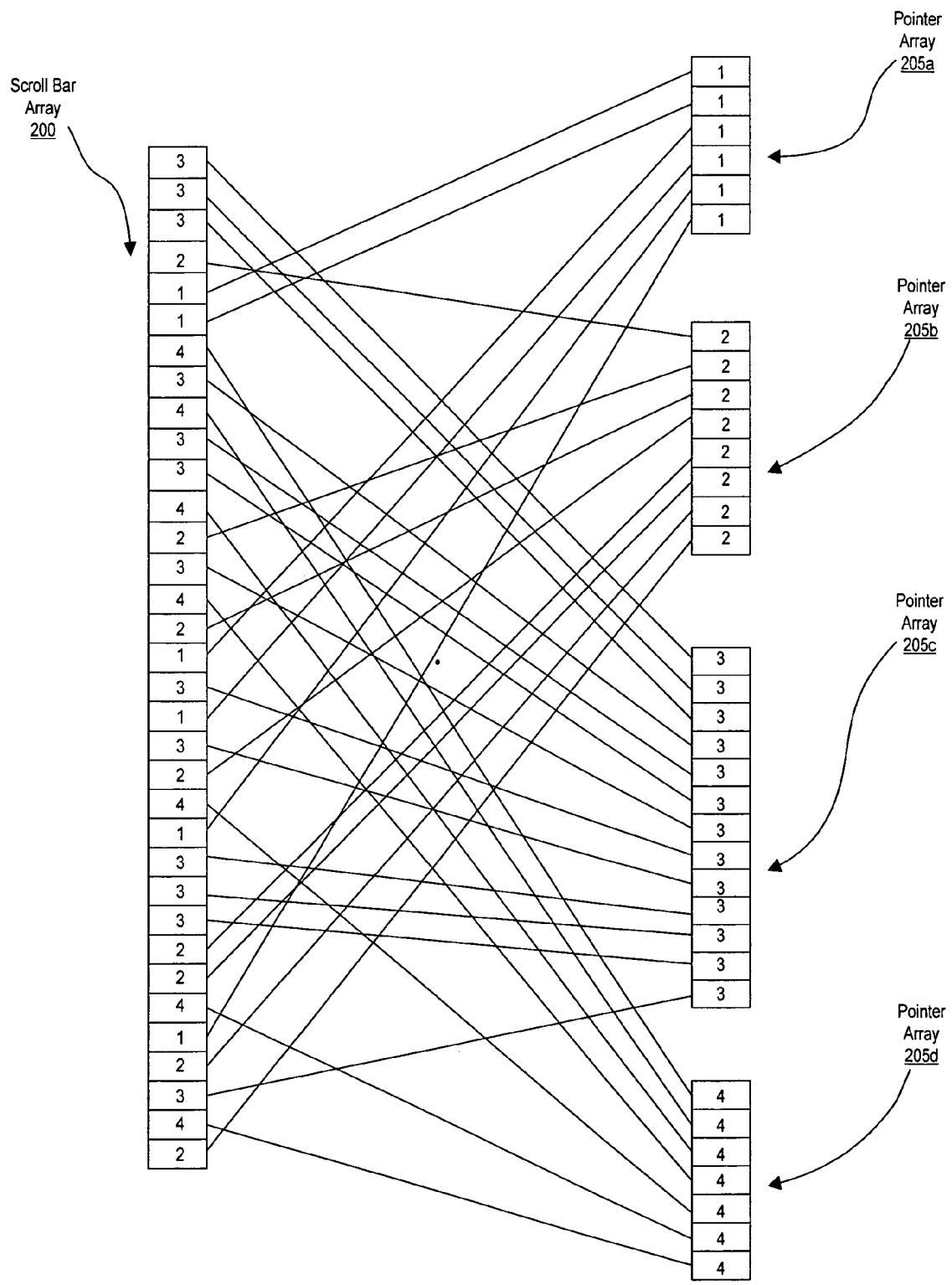
FIG. 2 illustrates data arrays in memory, according to an embodiment of the present invention.

FIG. 2 illustrates data structures in a computer memory, according to an embodiment of the present invention. The data structures may include arrays of data according to which the pace at which records of a number of data collections are scrolled in response to movement of a scroll bar, or in response to other scrolling instructions may be determined. A scroll bar array 200 may be provided. Each data element of the scroll bar array 200 may be associated with a corresponding scroll bar position. For each data collection to which a pane of the window 110 of FIG. 1 is assigned, a corresponding array of pointers 205 may be provided. Each pointer of the pointer arrays 205 corresponds to a record of a corresponding data collection. For example, a first data collection may include 6 records. A pointer array 205a may be provided that corresponds to the first data collection. The pointer array 205a may include 6 pointers, one for each record of the first data collection. Each pointer of the pointer arrays 205 points to a corresponding data element of the scroll bar array 200. Accordingly, each data element of the scroll bar array 200 corresponds to a record of the combination of records of all of the data collections to which a pane of the window 110 has been assigned. The data elements of the scroll bar array 200 are arranged to correspond in sequence to records sorted according to the sort category. If a number of records are associated with the same point in the sort category, then the data elements of the scroll bar array 200 that correspond to the number of records may be arranged randomly or according to another sorting algorithm, e.g., based on the data collections to which the records belong, or based on the application of any other conventional sorting algorithm to other content of the records. It will be appreciated that each data element of the scroll bar array 205 may be associated with a particular record in a number of ways. For example, a particular data element of the array may be associated with a particular record by virtue of the particular pointer of the pointer arrays 205 that points to the particular data element. Alternatively, the particular data element may independently be associated with the record, for example, by a tag, such as a string or integer value that identifies the record.

The pointers of each pointer array 205 may also be sorted as are the data elements of the scroll bar array 200. However, the pointers of a particular pointer array 205 corresponds to only those records of a particular data collection.

In an embodiment of the present invention, one data element of the scroll bar array 200 may be selected as a scrolling reference point. For example, a processor may store in a register designated as a reference register, the memory address of the data element selected as the scrolling reference point. The selected data element may be selected according to the scroll bar position. For example, the data elements of the scroll bar array 200 may be allocated consecutive memory addresses. For each single movement of the scroll bar 130 of FIG. 1 in the downward direction, the processor may increment the address in the reference register by one to refer to the next data element of the scroll bar array 200.

Similarly, in an embodiment of the present invention, the processor may select at least one pointer of every pointer array 205. For example, in one embodiment, the processor may select a beginning pointer and an ending pointer. The beginning pointer of a particular pointer array 205 may refer to the pointer of the particular pointer array 205 that is associated with the first record to be displayed in the pane assigned to the data collection to which the particular pointer array 205 is assigned. The ending pointer may likewise correspond to the last record to be displayed in the pane.

The number of pointers in the interval of pointers between, and for example including, the beginning and ending pointers may correspond to the number of records that may be concurrently displayed in the pane assigned to the corresponding data collection.

In an embodiment of the present invention, the processor may select a beginning pointer in accordance with the scrolling reference point. The processor may also select an ending pointer in accordance with the selected beginning pointer in view of the number of records of the corresponding data collection that may be concurrently displayed in the assigned pane. For example, if 6 records may be concurrently displayed in the pane, the processor may select the ending pointer by selecting the $5^{th}$ pointer following the beginning pointer.

In an embodiment of the present invention, one end of the scroll bar may be selected as a beginning edge by default. For example, the top end of a scroll bar extending from a top part of a window to a bottom part of a window as illustrated in FIG. 1, may be selected as the beginning edge by default. Accordingly, the pointer of a particular pointer array 205 that corresponds to the record closest to the data element of the scroll bar array 200 that corresponds to the beginning edge, may be treated as the beginning edge of the particular pointer array. In one embodiment, the edge of the scroll bar treated as the beginning edge may be determined according to a direction of change of the scroll bar. For example, if the user moves the scroll bar downward, then the top edge may be treated as the beginning edge. If the user moves the scroll bar upwards, then the bottom edge may be treated as the beginning edge.

In an embodiment of the present invention, the rule set may provide that a particular end of the scroll bar, and therefore a particular data element of the scroll bar array 200, is fixedly set as the beginning edge. According to this embodiment, the conditions under which the beginning and ending pointers of a pointer array 205 are changed may vary according to the direction in which the scroll bar is moved.

For example, in one embodiment of the present invention, the rule set may provide that if the reference point is changed towards the end edge of the scroll bar array 200, and if a particular pointer array 205 includes a particular pointer that points to the data element of the scroll bar array 200 selected as the reference point, then the particular pointer is set as the beginning pointer of the particular pointer array 205. On the other hand, the rule set may provide that if the user then scrolls the scroll bar in the opposite direction, then even if the new reference point does not correspond to a pointer of the particular pointer array 205, nevertheless the beginning pointer of the particular pointer array 205 may be changed to the pointer preceding the particular pointer.

Figure 3:
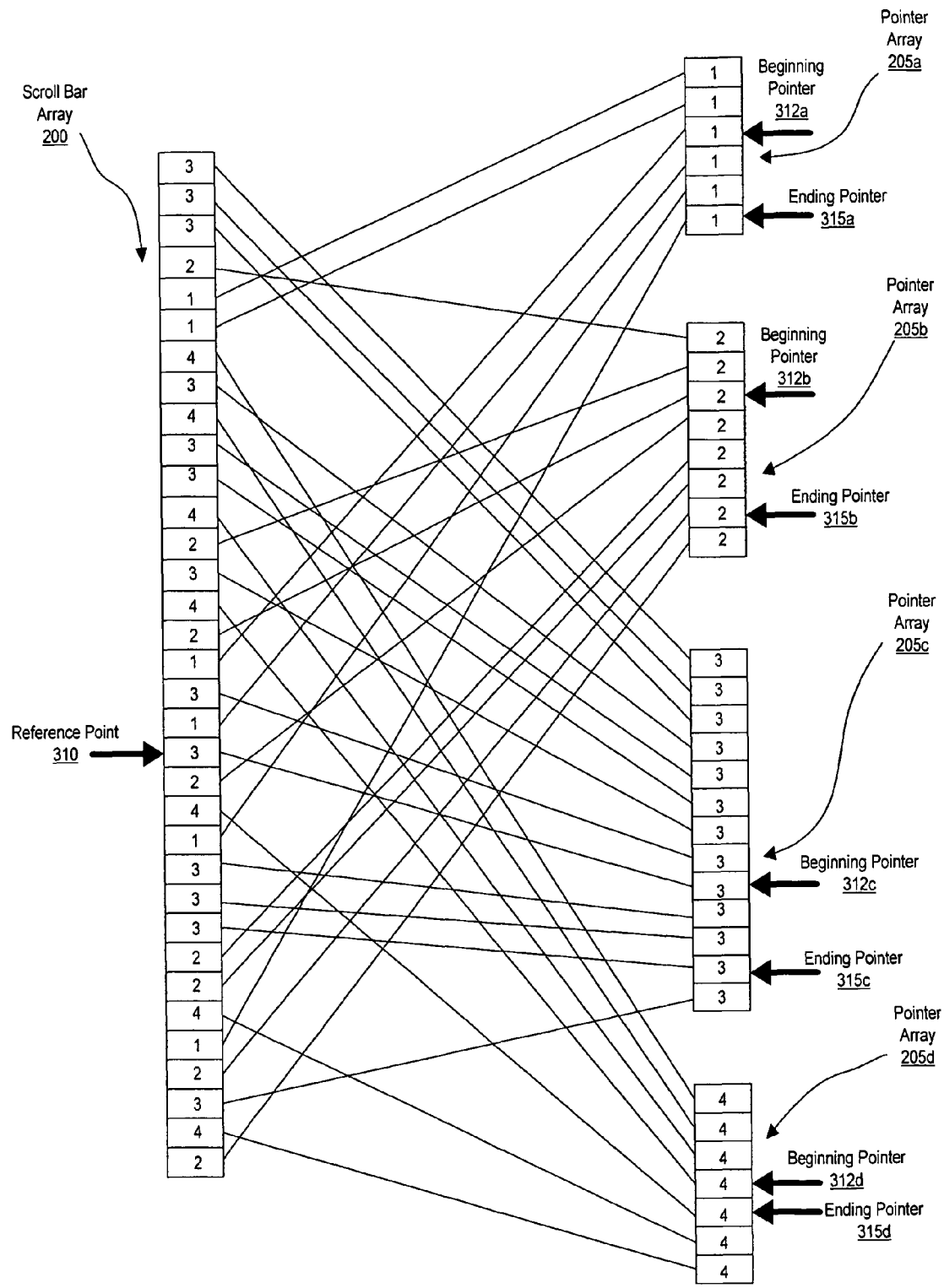
FIG. 3 illustrates a selection of beginning and ending pointers of a plurality of pointer arrays in accordance with a reference point of a scroll bar array, according to an embodiment of the present invention.

For example, FIG. 3 illustrates the selection of a data element of the scroll bar array 200 that corresponds to the ninth pointer of pointer array 205c as the reference point 310. FIG. 3 also illustrates the selection of the ninth pointer of pointer array 205c as the beginning pointer 312c, and the selection of the twelfth pointer as the ending pointer 315c, since in this particular example, the pane corresponding to pointer array 205c concurrently displays up to 4 records. According to this embodiment, if the user moves the scroll bar upwards, so that the reference point 310 is changed to the immediately preceding data element of the scroll bar array 200, then the beginning pointer 312c of pointer array 205c may be changed to the eighth pointer of the pointer array 205c, even though the immediately preceding data element of scroll bar array 200 does not correspond to a pointer of pointer array 205c, since the eighth pointer would have been selected as the beginning pointer before movement of the reference point 310 towards the position shown in FIG. 3, with respect to a direction away from the fixed beginning edge.

Alternatively, the rule set may provide that the conditions under which the beginning and ending pointers of a pointer array 205 are changed are the same for scrolling in either direction. According to this embodiment, the beginning pointer 312c would be changed to the eighth pointer of pointer array 205c only if the reference point 310 of FIG. 3 is moved two elements back towards the beginning edge.

According to the embodiment in which the beginning and ending edges of the scroll bar array 200 vary depending on the direction in which the scroll bar is moved, if after the movement of the reference point 310 towards the ending edge, the reference point 310 is moved in the reverse direction, the beginning and ending pointers of the pointer arrays 205 may be drastically changed. For example, in response to such movement of the reference point 310 of FIG. 3, the beginning pointer 312c would remain set to the ninth pointer, but the ending pointer 315c would be changed to the sixth pointer, rather than the twelfth.

In one embodiment of the present invention, a rule set may be provided that maximizes an overlap of the interval of pointers of all of the pointer arrays 205 corresponding to records displayed in a window. For example, aside from considering the relationship of a particular pointer array's pointers to the reference point 310, the rule set may provide for additionally considering a comparison of the interval of pointers of the particular pointer array 205 to the interval of pointers of each of the other pointer arrays 205 of the window. The rule set may provide that if (a) other pointer arrays 205 include pointers that point to data elements of the scroll bar array 200 positioned, with respect to the scrolling direction, after the data element to which the ending pointer 315 of the particular pointer array points, and (b) the particular pointer array's ending pointer 315 points to a data element of the scroll bar array 200 that, with respect to the scrolling direction, is positioned after the data elements of the scroll bar array 200 to which all of the ending pointers 315 of the other pointer arrays 205 point, then the beginning pointer 312 and the ending pointer 315 of the particular pointer array 205 is not changed, even if the particular pointer array 312 includes a pointer that points to the data element of the scroll bar array 200 set as the new reference point 310. Instead, the change in the beginning and ending pointers of the particular pointer array 205 may be delayed, for example, at least until an interval of at least one other pointer array 205 is changed so that the ending pointer 315 of the other pointer array 205 points to a data element of the scroll bar array 200 that, with respect to the scrolling direction, is positioned after the data element to which the ending pointer 315 of the particular pointer array 205 points. In one embodiment, upon satisfaction of this condition, the interval of the particular pointer array 205 may be immediately changed. According to an alternative embodiment, the change may be further delayed until the reference point 310 is again changed to a data element to which a pointer of the particular pointer array 205 points.

Figure 4:
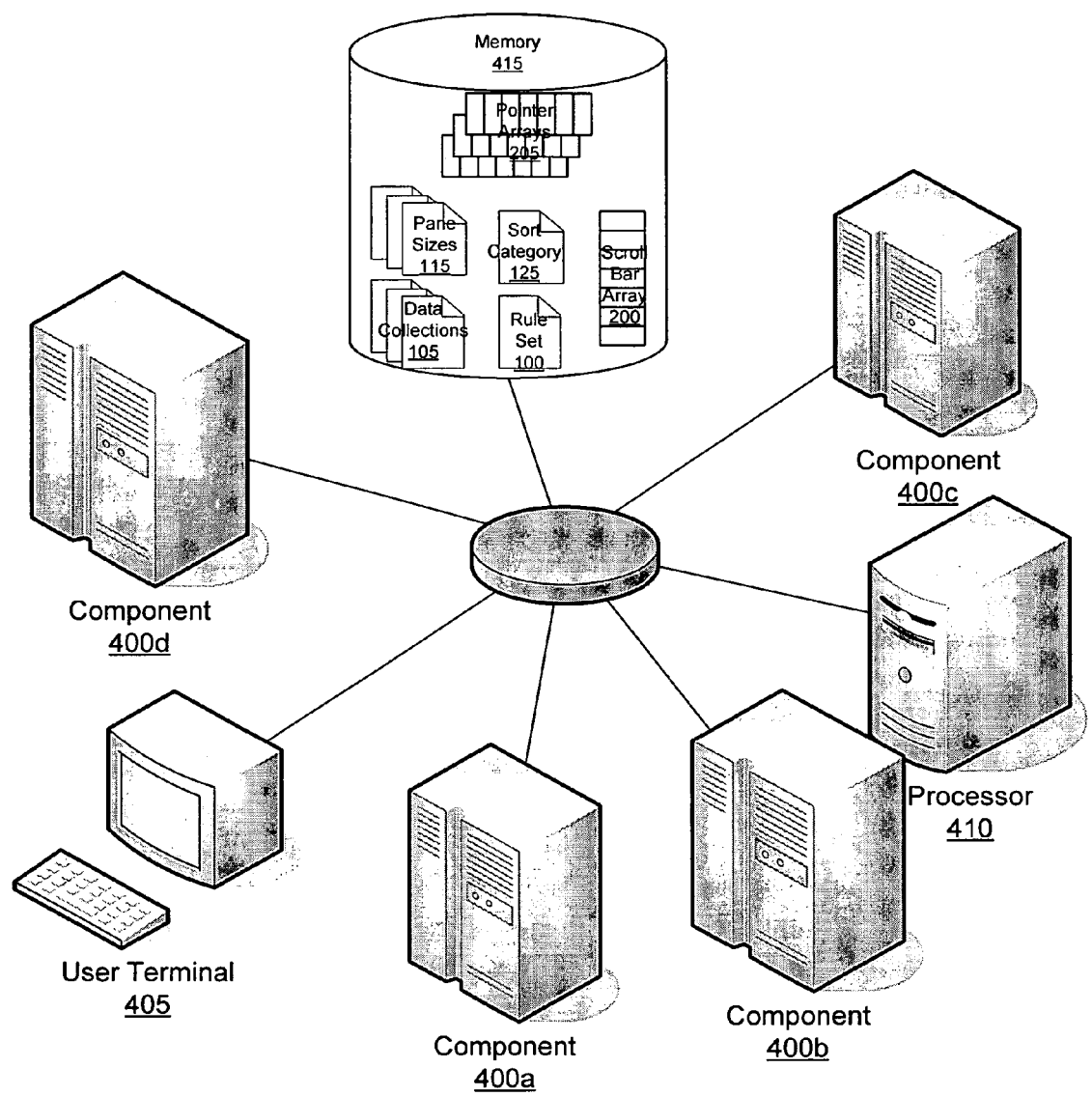
FIG. 4 is a block diagram that illustrates components of an example system running in a distributed environment according to an embodiment of the present invention.
Figure 5:
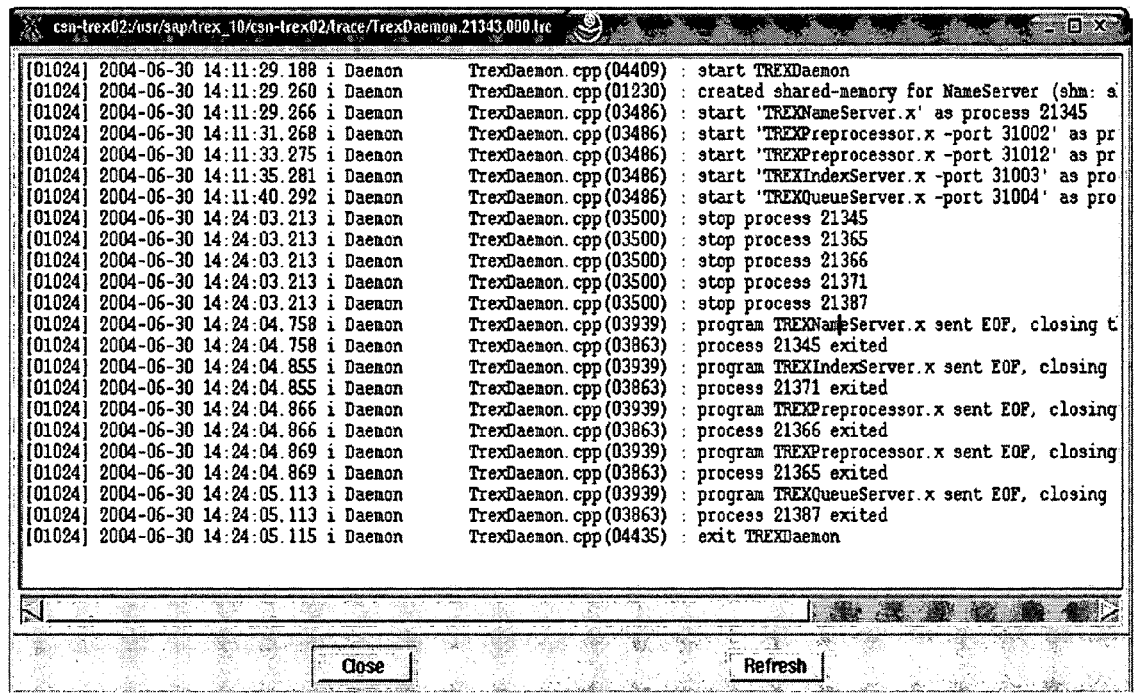
FIG. 5 is a screenshot that illustrates an example trace file.

FIG. 4 is a block diagram that illustrates components of a system, according to an embodiment of the present invention. A number of components 400 may be provided. For example, the components 400 may be servers of a search engine running in a distributed environment, for example connected via a network. One or more data collections 105 may be associated with a corresponding component 400. For example, a data collection 105 may be a trace file. Each record of a trace file may indicate a program action at a particular time. FIG. 5 is a screenshot of an example window in which an example trace file is displayed. Each line of the displayed trace file as shown in FIG. 5 displays data of a record and includes a time stamp and a description of an occurrence associated with the time stamp, for example that took place at the time indicated by the time stamp. The records of the trace file displayed in FIG. 5 are shown sorted according to time.

A user may view data of the components 400, for example, records of the data collections 105, at a user terminal 405, illustrated in FIG. 4. For example, a list of trace files and the components 400 with which the trace files are associated may be provided to the user at terminal 405, e.g., in a window. The user may select one or more of the listed files, for example by a point-and-click of a mouse placed over the area of the window in which a reference to the desired file is displayed.

Figure 6:
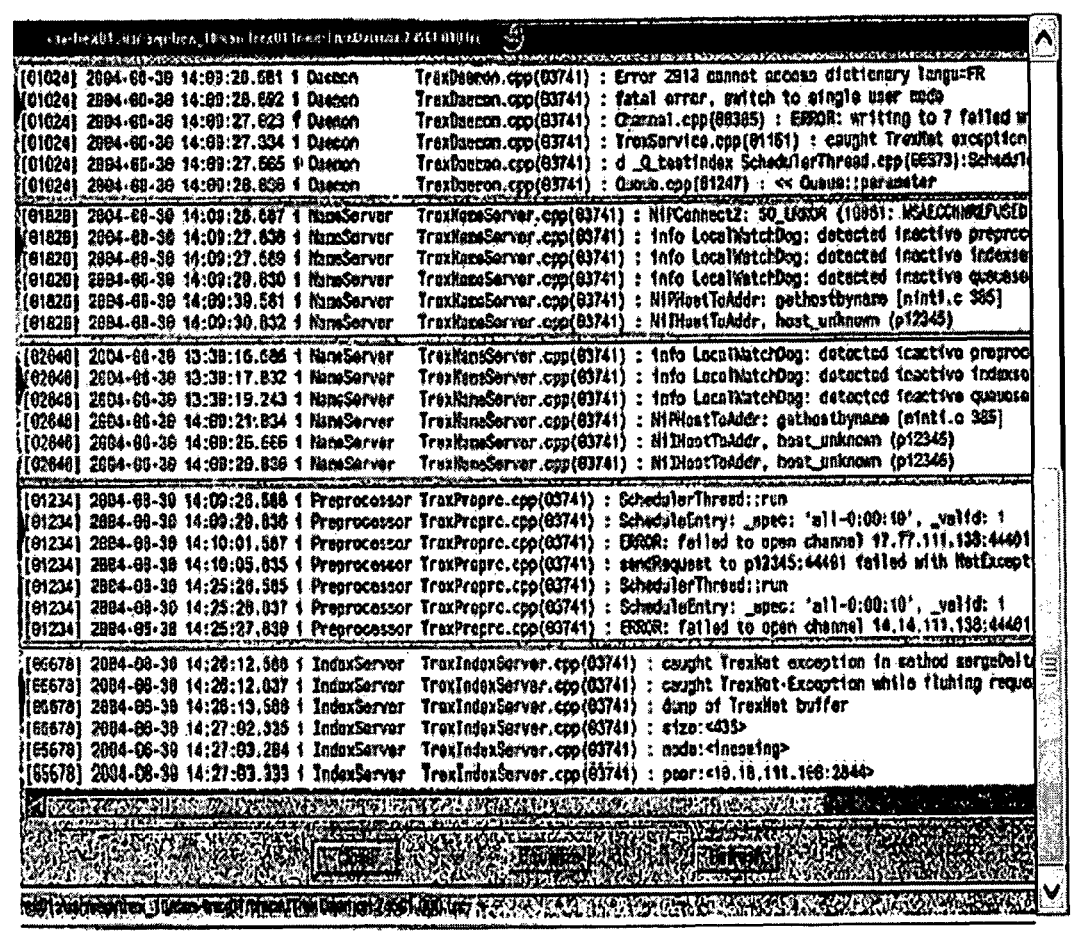

The selection may instruct a processor 410, illustrated in FIG. 4, to display records of the selected trace files at the user terminal 405. In response, the processor 410 may retrieve the selected trace files, i.e., the selected data collections 105, from a memory 415. The memory 415 may store, e.g., the rule set 100, data collections 105, pane sizes 115, scroll bar array 200, and pointer arrays 205. In accordance with the rule set 100, the pane sizes 115 assigned to the selected trace files, the scroll bar array 200, and the pointer arrays 205, the processor 410 may display in a single window the selected trace files, as illustrated in FIG. 6, and may scroll through records of the displayed trace files in response to user-input scrolling instructions, as described above with respect to FIGS. 1-3. In an example embodiment, the memory 415 is an article of manufacture that includes a computer-readable medium, and the rule set 100 stored thereon is in the form of instructions adapted to be executed by the processor 410, such that, when the instructions are executed by the processor 410, the processor 410 is configured to perform one or more, e.g., all, of the methods described herein, for example, for responding to a user-input scrolling instruction and/or for displaying portions of the data collections 105.

Those skilled in the art can appreciate from the foregoing description that the present invention can be implemented in a variety of forms. For example, rule sets other than those described above may be provided according to which data of a plurality of panes may be scrolled at independent paces in response to a single scroll instruction. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:
1. A display method, comprising:
   a processor sorting, amongst each other and into a respective order, a plurality of data records of a first data set, wherein the order into which the data records of the first data set are sorted is determined by a sort category;
   the processor sorting, amongst each other and into a respective order, a plurality of data records of a second data set, wherein the order into which the data records of the second data set are sorted is determined by the sort category;

displaying, by the processor, data records of the first data set and data records of the second data set according to the respective sort orders;

independently determining, by the processor, a scrolling pace for scrolling through the records of the first data set and a scrolling pace for scrolling through the records of the second data set, wherein:

each of the plurality of data records of the first data set and each of the plurality of data records of the second data set includes a respective data element associating the respective record with a particular one of a plurality of sequential reference points of the sort category; and the determining of the scrolling paces includes determining respective relationships of the data records of the first and second data sets to the sort category, the relationships being determined based on the associations between the records and the reference points, and the respective paces being based on the determined associations; and responsive to a scrolling instruction:

traversing the plurality of sequential reference points; and based on the traversal of the plurality of sequential reference points, simultaneously scrolling through the records of the first data set at the respective pace determined for the records of the first data set, and through the records of the second data set at the respective pace determined for the records of the second data set;

wherein the scrolling paces vary for different relationships between (a) the data records of the first and second data sets that are displayed during the scrolling, and (b) the sort category, each pace being determined according to a number of data records of a corresponding one of the first and second data sets that corresponds to a reference point being traversed.

2. The display method of claim 1, wherein each of the data records of the first and second data sets is associated with a particular one of the plurality of sequential reference points of the sort category; and wherein:

the reference points include a first reference point, a second reference point, and an intervening reference point that is between the first and second reference points with respect to the sequence; and upon a condition that the first and second data sets do not include data records that correspond to the intervening reference point, the second reference point is traversed immediately following a traversal of the first reference point, traversal of the intervening reference point being omitted.

3. The display method of claim 1, wherein scrolling of the first and second data sets at their independently determined scrolling paces provides for interrelating portions of the first and second data sets to be concurrently displayed.

4. The display method of claim 1, wherein:

the scrolling paces of the data records of the first and second data sets in response to a single scroll instruction differ; and the paces are determined in accordance with a degree of congestion of respective data records of the first and second data sets that correspond to a selected one of the plurality of sequential reference points of the sort category.

5. The method of claim 4, wherein:

the sorting of the data records includes:

arranging in a first memory location an array of data elements, each data element associated with a corresponding one of the plurality of data records of the first and second sets, the array of data elements arranged sequentially according to a sequential arrangement of a combination of the plurality of records sorted according to the sort category;

for each of the first and second data sets, arranging a plurality of pointers in a corresponding second memory location, wherein:

each pointer of each plurality of pointers is associated with a corresponding record of the data set to which the plurality of pointers corresponds;

each pointer of each of the plurality of pointers points to a corresponding data element of the array that corresponds to the corresponding record; and the pointers are arranged in the sequence according to which the data elements to which they point are arranged;

the traversal of the sequential reference points includes selecting as a reference a particular one of the data elements of the first memory location;

the determination of the scrolling paces includes, for each of the first and second data sets, selecting in the corresponding second memory location a beginning pointer and an ending pointer for a display interval;

data records of the first and second data sets that correspond to the display intervals are displayed; and the selection of the beginning pointer is based on the selected reference.

6. The method of claim 5, further comprising:

in response to the scrolling instruction and with respect to a scrolling direction of the scrolling instruction, changing the reference selection to a following data element of the array.

7. The method of claim 6, further comprising:

for each of the first and second data sets, in response to the reference selection change and with respect to a first scrolling direction:

changing the beginning pointer of the corresponding second memory location from a first beginning pointer to a pointer following the first beginning pointer upon a condition that the pointer following the first beginning pointer corresponds to the following data element of the array; and if the beginning pointer is changed, changing the ending pointer of the corresponding second memory location from a first ending pointer to a pointer following the first ending pointer.

8. The method of claim 7, wherein:

the beginning pointer of one of the first and second data sets is changed upon a further condition that the ending pointer of another of the first and second data points to a first data element of the array that is positioned, with respect to the scrolling direction, after a second data element of the array to which the ending pointer of the one of the first and second data points; and the further condition is applied upon a condition that the plurality of pointers of the another of the first and second data sets includes a pointer that points to the first data element.

9. The method of claim 7, wherein, with respect to a second scrolling direction, the beginning and ending pointers are changed to undo an immediately preceding change in the beginning and ending pointers, the immediately preceding change being in the first scrolling direction.

10. The method of claim 5, wherein, for each of the first and second data sets, pointers selected as the beginning and ending pointers are pointers that form a display interval that corresponds to those of the data records that, with respect to the particular category, most closely relates to the selected reference.

11. The method of claim 5, wherein:
a corresponding display area is assigned to each of the first and second data sets;
a size of each of the corresponding display areas is independently variable; and
a size of each display interval is independently variable in accordance with the size of the corresponding display area with which the display interval is associated.

12. The display method of claim 1, further comprising:
in response to the scrolling instruction, determining whether to scroll through one or both of the first and second data sets, a result of the determination depending on a relationship of displayed portions of the data sets to a reference point of the sort category,
wherein, the determination is performed when, with respect to the sort category, each of the first and second data sets includes at least one respective non-displayed portion that precedes the respective displayed portion and at least one respective non-displayed portion that follows the respective displayed portion.

13. An article of manufacture comprising a computer-readable medium having stored thereon instructions adapted to be executed by a processor, the instructions which, when executed, define a display method, the method comprising:
sorting, amongst each other and into a respective order, a plurality of data records of a first data set, wherein the order into which the data records of the first data set are sorted is determined by a sort category;
sorting, amongst each other and into a respective order, a plurality of data records of a second data set, wherein the order into which the data records of the second data set are sorted is determined by the sort category;
displaying data records of the first data set and data records of the second data set according to the respective sort orders;
independently determining a scrolling pace for scrolling through the records of the first data set and a scrolling pace for scrolling through the records of the second data set, wherein:
each of the plurality of data records of the first data set and each of the plurality of data records of the second data set includes a respective data element associating the respective record with a particular one of a plurality of sequential reference points of the sort category; and
the determining of the scrolling paces includes determining respective relationships of the data records of the first and second data sets to the sort category, the relationships being determined based on the associations between the records and the reference points, and the respective paces being based on the determined associations; and
responsive to a scrolling instruction:
traversing the plurality of sequential reference points; and
based on the traversal of the plurality of sequential reference points, simultaneously scrolling through the records of the first data set at the respective pace determined for the records of the first data set, and through the records of the second data set at the respective pace determined for the records of the second data set;
wherein the scrolling paces vary for different relationships between (a) the data records of the first and second data sets that are displayed during the scrolling, and (b) the sort category, each pace being determined according to a number of data records of a corresponding one of the first and second data sets that corresponds to a reference point being traversed.

14. The article of manufacture of claim 13, wherein scrolling of the first and second data sets at their independently determined scrolling paces provides for interrelating portions of the first and second data sets to be concurrently displayed.

15. The method of claim 1, wherein, for each of the data records, the association of the data record to one of the sequential reference points is independent of a position at which the record is displayed.

16. The method of claim 1, wherein the reference category is one of time and an alphabet.

17. The method of claim 1, wherein:
user interaction with a scroll control changes a selected one of the sequential reference points from a first reference point to a second reference point;
the simultaneous scrolling is performed in response to a first user operation of the scroll control;
in response to a second operation of the scroll control:
that records of a first one of the first and second data sets that are most closely related to the second reference point are also records of the first one of the first and second data sets that are most closely related to the first reference point is determined, and, based on the determination, the first one of the first and second data sets is not scrolled; and
that records of a second one of the first and second data sets that are most closely related to the second reference point are different than records of the second one of the first and second data sets that are most closely related to the first reference point is determined, and, based on the determination, the second one of the first and second data sets is scrolled; and
the relationships of the records to the reference points are determined based on the associations of the records to respective ones of the reference points.

18. The method of claim 5, wherein, in response to a change of scrolling direction, a direction from the beginning pointer to the ending pointer is changed.

19. The method of claim 5, wherein a direction from the beginning pointer to the ending pointer is independent of a scrolling direction.

20. The method of claim 5, wherein a change of the beginning pointer of one of the first and second data sets is further conditioned so that the change is not performed if both:
   (a) a respective plurality of pointers of another of the first and second data sets includes a pointer that points to a data element of the array positioned, with respect to a scrolling direction, after a position of a data element of the array to which the ending pointer of the one of the first and second data sets points; and
   (b) the ending pointer of the another of the first and second data sets points to a data element of the array that is positioned, with respect to the scrolling direction, before the position of the data element of the array to which the ending pointer of the one of the first and second data sets points.

21. The method of claim 11, wherein, for each of the first and second data sets, the size of the corresponding display area is determined by a ratio of a number of records of the respective data to a number of records in all remaining data that is scrolled with the respective data in response to a single scroll instruction.

22. The method of claim 12, further comprising:
   in response to the scrolling instruction, changing a selection from a second reference point of the sort category to the first reference point, wherein, for each of the first and second data sets, the result of the determination depends on a respective difference between a relationship of the respective data set to the second reference point and the relationship of the respective data set to the first reference point.

* * * * *